United States Patent [19]

Fahnenstich et al.

[11] 3,982,026
[45] Sept. 21, 1976

[54] SILAGE AID

[75] Inventors: Rudolf Fahnenstich, Mombris; Wilhelm Schuler, Bad Homburg; Herbert Tanner, Hanau; Otto Weiberg, Neu-Isenburg, all of Germany

[73] Assignee: Deutsche Gold- und Silber-Scheideanstalt vormals Roessler, Germany

[22] Filed: Mar. 18, 1975

[21] Appl. No.: 559,495

Related U.S. Application Data

[63] Continuation-in-part of Ser. No. 558,685, March 17, 1975, abandoned.

[30] Foreign Application Priority Data

Mar. 16, 1974  Germany............................ 2412834

[52] U.S. Cl.................................. 426/54; 426/53; 426/61

[51] Int. Cl.² ...................... A23K 1/00; A23K 3/03
[58] Field of Search ................. 426/53, 54, 61, 636, 426/321, 532

[56] References Cited
OTHER PUBLICATIONS

Chem. Abstr., vol. 78, 1973, p. 329, 8305f and 8305g, Jung "Action of Various Silage Additives".
Gross et al., "Comparative Investigations on the Effects of Various Silage Additives".

Primary Examiner—A. Louis Monacell
Assistant Examiner—C. A. Fan
Attorney, Agent, or Firm—Cushman, Darby & Cushman

[57] ABSTRACT

Propylene glycol esters of propionic acid are added to silage to improve the quality thereof.

12 Claims, No Drawings

SILAGE AID

This application is a continuation-in-part of application Ser. No. 558,685, filed Mar. 17, 1975, and now abandoned.

The present invention relates to additives for silage. In the silaging, the production of fermented fodder, it is essential to form lactic acid. In many cases it is suitable, or essential, to influence the fermentation by admixing additives, namely to promote the growth of lactic acid bacteria and simultaneously to check undesired fermentation processes, especially to suppress the growth of those organisms which cause the formation of butyric acid. Decisive to the quality of the silage is chiefly the course of the fermentation during the first days.

It is known that at a pH of about 4 almost exclusively lactic acid bacteria are viable and therefore there are used as additives for silage acids which are suited for the establishment of such a pH. For example there are used formic acid, propionic acid or mixtures of hydrochloric acid with sulfuric acid or phosphoric acid. By the addition of the acids the formation of butyric acid can be checked in effect from the beginning. It is also known to add the salts of the above named acids. Insofar as there are used the acidic alkali salts of mineral acids, as for example $NaH_5(PO_4)_2 \cdot NaHSO_4$ the action corresponds largely to the action of the free acids. However, if neutral salts are used, as for example sodium propionate or calcium propionate the action is slower and less than with the free acids. Especially in the decisive initial phase of the fermentation the formation of butyric acid often is only checked insufficiently.

It has now been found that the propylene glycol esters of propionic acid are outstandingly suited as additives for silage. Although these esters are neutral, the effect occurs more quickly and strongly than with the acids. Not only are the undesired fermentation processes such as the formation of butyric acid prevented in an outstanding manner but besides the formation of lactic acid is promoted. The action of the esters surpasses the action of propionic acid, even though if the alcohol component of the ester, 1,2-propylene glycol, is used alone, it acts as a substance which unfavorably influences the fermentation.

As additives according to the invention there can be used all of the 1,2-propylene glycol esters of propionic acid, namely propylene glycol-1-monopropionate, propylene glycol-2-monopropionate and propylene glycol-1,2-dipropionate. There can be used the individual esters or likewise mixtures of the esters.

The concentration of the ester in the silage can be chosen within wide limits and is arranged to a certain extent according to the type of silage and silaging conditions. Generally it is suitable to add to the silaging material at least about 0.01 to about 1.0 weight percent of ester. Larger amounts, about from 2 to 5 weight percent, are only seldom of importance, though they can be used. Preferably the ester addition is 0.1 to 0.5 weight percent.

The ester is chiefly used as such. However, it can also be added in mixtures with other substances. In this connection there can be used substances which have an action as additives for silage or as preservatives, or other substances which are inert. A mixture of the ester with highly dispersed silicon dioxide (silica) or other absorptively acting solids can serve if necessary to convert the esters which are liquids having slight miscibility with water into a flowing solid.

The esters used as additives in the invention can be used with all kinds of silage, especially silage from plants such as grass, alfalfa, vetch grains, clover, green corn, beets and potatoes.

Unless otherwise indicated all parts and percentages are by weight.

EXAMPLE 1

There were silaged in each case 650 gram samples of freshly mowed meadow grass. In all 56 samples were prepared and they were placed in 7 groups, each with 8 equal samples.

Group 1 without any additive.
Group 2a with addition of 0.2 weight percent of propylene glycol.
Group 2b with addition of 0.4 weight percent of propylene glycol.
Group 3a with addition of 0.2 weight percent of propionic acid.
Group 3b with addition of 0.4 weight percent of propionic acid.
Group 4a with addition of 0.2 weight percent of propylene glycol-1,2-dipropionate.
Group 4b with addition of 0.4 weight percent of propylene glycol-1,2-dipropionate.

The samples were kept in gas tight closed vessels of about 1 liter content at an outside temperature of 24°C. for 90 days.

In order to estimate the quality of the silage as a measure of the loss of nutrients there was determined the loss of fermentation gas in the fermentation. Furthermore the quality of the silage was determined according to smell, color and texture according to the DLG-Garfutterschlussel (DLG-fermented fodder code) (Handbuch der Futtermittel, Vol. 1 (1969), Verlag Paul Parey, Hamburg and Berlin). The results were as follows:

| Group | Gas Loss Average Value of the Group (%) | Quality of the Silage |
| --- | --- | --- |
| 1 | 7.9 | poor |
| 2a | 8.2 | poor |
| 2b | 8.7 | poor |
| 3a | 3.0 | good |
| 3b | 1.7 | very good |
| 4a | 1.8 | very good |
| 4b | 1.3 | very good |

EXAMPLE 2

The procedure was the same as in Example 1 except there was silaged samples each containing 820 grams of moist corn grains. In all 32 samples were employed and they were divided into 4 groups, each with 8 equal samples.

Group 1 without any additive.
Group 2 with addition of 0.4 weight percent of propylene glycol.
Group 3 with addition of 0.4 weight percent of propionic acid.
Group 4 with addition of 0.4 weight percent of a mixture of the two propylene glycol monopropionates.

The results were as follows:

| Group | Gas Loss Average Value of the Group (%) | Quality of the Silage |
|---|---|---|
| 1 | 5.2 | poor |
| 2 | 5.5 | poor |
| 3 | 1.2 | very good |
| 4 | 0.9 | very good |

EXAMPLE 3

The procedure was the same as in Example 1 but there were silaged 640 gram samples of alfalfa. In all 32 samples were employed and they were divided into 4 groups of 8 equal samples.

Group 1 without any additive.

Group 2 with addition of 0.3 weight percent propylene glycol.

Group 3 with addition of 0.3 weight percent propionic acid.

Group 4 with addition of 0.2 weight percent propylene glycol-1,2-dipropionate and 0.1 weight percent of a mixture of the two propylene glycol monopropionates.

| Group | Gas Loss Average Value of the Group (%) | Quality of the Silage |
|---|---|---|
| 1 | 9.3 | poor |
| 2 | 11.4 | poor |
| 3 | 3.7 | good |
| 4 | 2.4 | very good |

We claim:
1. Silage containing as an additive thereto 0.01 to 5% a propylene glycol ester of propionic acid.
2. Silage according to claim 1 wherein the ester is propylene glycol dipropionate.
3. Silage according to claim 1 wherein the ester is propylene glycol monopropionate.
4. Silage according to claim 1 containing 0.01 to 2% of said ester.
5. Silage according to claim 4 containing 0.01 to 1.0% of said ester.
6. Silage according to claim 5 containing 0.1 to 0.5% of said ester.
7. A process of promoting the formation of lactic acid in silage comprising adding to fodder to be silaged 0.01 to 5% of a propylene glycol ester of propionic acid and then silaging said fodder.
8. The process of claim 7 wherein the ester is propylene glycol dipropionate.
9. The process of claim 7 wherein the ester is propylene glycol monopropionate.
10. The process of claim 7 wherein there is added 0.01 to 2% of said ester.
11. The process of claim 10 wherein there is added 0.01 to 1.0% of said ester.
12. The process of claim 11 wherein there is added 0.1 to 0.5% of said ester.

* * * * *